United States Patent
Van Blokland

(10) Patent No.: US 11,344,033 B2
(45) Date of Patent: May 31, 2022

(54) DEVICE FOR BENDING DOUGH PIECES

(71) Applicant: Radie B.V., BC Culemborg (NL)

(72) Inventor: Johannes Josephus Antonius Van Blokland, BG Laren (NL)

(73) Assignee: RADIE B.V.

( * ) Notice: Subject to any disclaimer, the term of this patent is extended or adjusted under 35 U.S.C. 154(b) by 29 days.

(21) Appl. No.: 16/863,478

(22) Filed: Apr. 30, 2020

(65) Prior Publication Data

US 2020/0345016 A1   Nov. 5, 2020

(30) Foreign Application Priority Data

May 3, 2019 (EP) .................................... 19172559

(51) Int. Cl.
    *A21C 9/08*      (2006.01)
    *A21C 3/06*      (2006.01)

(52) U.S. Cl.
    CPC ................ *A21C 9/088* (2013.01); *A21C 3/06* (2013.01)

(58) Field of Classification Search
CPC .. A21C 9/00; A21C 9/088; A21C 3/00; A21C 3/06; A21C 3/08
See application file for complete search history.

(56) References Cited

U.S. PATENT DOCUMENTS

| 4,741,263 A | 5/1988 | Ueno et al. |
| 4,961,697 A | 10/1990 | De Fockert |
| 5,382,154 A * | 1/1995 | Morikawa ................ A21C 3/06 198/456 |
| 5,460,081 A | 10/1995 | Ueno et al. |
| 5,516,538 A * | 5/1996 | Ueno ....................... A21C 3/06 426/231 |
| 8,961,165 B2 * | 2/2015 | Van Blokland .......... A21C 3/06 425/319 |
| 2010/0242743 A1 * | 9/2010 | Hashimoto ............ A21C 11/10 99/450.1 |
| 2011/0097467 A1 | 4/2011 | Van Blokland |
| 2013/0059051 A1 * | 3/2013 | Bernhardt .............. A21C 9/088 426/499 |

(Continued)

FOREIGN PATENT DOCUMENTS

| AT | 326065 B | 11/1975 |
| DE | 10034177 A1 | 8/2001 |
| EP | 2422623 A2 | 2/2012 |

(Continued)

OTHER PUBLICATIONS

The extended European search report dated Aug. 26, 2019, from European Patent Application No. 19172559.7, 9 sheets.

*Primary Examiner* — Nahida Sultana

(74) *Attorney, Agent, or Firm* — Katten Muchin Rosenman LLP

(57) ABSTRACT

Device for bending dough pieces, in particular croissants, is provided. The device comprises a first conveyor for transporting dough pieces in a direction of conveyance, at least a first gate for defining a passage with a first width, smaller than the width of the conveyor, for the dough pieces, and at least two engaging means for engaging a dough piece entering the passage and exerting a force on the dough piece with a directional component toward the first conveyor, wherein both engaging means are spaced apart from each other, thus leaving a gap in between them.

20 Claims, 4 Drawing Sheets

(56) References Cited

U.S. PATENT DOCUMENTS

2015/0099049 A1* 4/2015 Harada ................... A21C 3/08
426/502

FOREIGN PATENT DOCUMENTS

| EP | 2625958 A2 | 8/2013 |
|---|---|---|
| EP | 3053442 A1 | 8/2016 |
| IT | BO20090428 A1 | 1/2011 |

* cited by examiner

DEVICE FOR BENDING DOUGH PIECES

CROSS-REFERENCE TO RELATED APPLICATIONS

This application claims priority of European Patent Application Number 19172559.7, entitled "DEVICE FOR BENDING DOUGH PIECES," filed on May 3, 2019 in European Patent Office, and herein incorporated by reference in its entirety.

TECHNICAL FIELD

The present invention relates to a device for bending dough pieces, more in particular a device for bending croissants.

BACKGROUND

In a classic way, croissants are made by rolling up an essentially triangular dough piece, starting at the basis and ending at a tip. However, nowadays, croissants that are bent in half-moon or C shape have become common too, as well as croissants with the tips of their legs bent against or on top of each other. These latter two versions need to be bent further than the C-shaped ones, and an essentially annular shape is required. However, the equipment according to the state of the art has appeared not to be suitable to fulfil this need. Another disadvantage of the state of the art equipment is that they are less suitable for bending filled croissants, that is croissants filled with a (semi) fluid fill, at least before baking, for instance chocolate or marmalade. The devices tend to exert too much force on the croissant at those places where the filling is placed, which leads to displacement of the filling to undesired places or even tear of the croissant.

SUMMARY

It is therefore a goal of the present invention to provide a device for bending dough pieces that takes away at least some of the disadvantages of the prior art, or at least to provide a useful alternative thereto.

The invention thereto proposes a device for bending dough pieces, in particular croissants, comprising a first conveyor, for transporting dough pieces in a direction of conveyance, at least a first gate, defining a passage with a first width, which is smaller than the width of the conveyor, for the dough pieces, at least two engaging means, for engaging a dough piece entering the passage and exerting a force on the dough piece with a directional component toward the first conveyor, wherein both engaging means are spaced apart from each other, thus leaving a gap in between them.

A first advantage over the prior art, which is characterized by a single engaging means formed by a central wheel, is that the dough pieces are bent following the shape and size of the gate. When bent with prior art devices, a central fold tends to occur, leading to an undesired V-shaped dough product. The device according to the present invention allows to create a C shaped form with two clear bends. This effect is even stronger when the engaging means are placed adjacent to the edges of the passage formed by the gate. Additionally, the dough piece has shown to better remain in its bent position with such placement of the engaging means. A second advantage is obtained because the dough piece is not touched in between the engaging means. This avoids any impact on a filling of the dough pieces, which is normally applied in the center of the dough piece.

The gate may comprise a third and a second conveyors, each having a surface of conveyance, both surfaces facing each other and arranged with a directional component perpendicular to the first conveyor. In particular, third and a second conveyor are perpendicular to the first conveyor, and preferably also close to or adjacent to the surface of the first conveyor. With respect to a center line through the gate, in the direction of conveyance of the first conveyor, the second and third conveyor may have a mutually mirrored configuration.

In a preferred embodiment, the front of the gate comprises at least one pillar, rotatable about its length axis, extending with a directional component perpendicular to the first conveyor. The pillar preferably has a cylindrical shape, and serves to smoothly guide the bent ends of the dough piece into the gate.

In a further embodiment of according to the present invention, the device comprises a second gate, arranged downstream of the first gate, as an extension of the first gate. Such second gate may be applied for various reasons. A first reason may be to further bend a dough piece, in particular for croissants of which the legs are to be pinched against or on top of each other. In that case the second gate may be dimensioned with a smaller width than the first gate. It may also be beneficial to use a second gate to anchor the bent form better in the dough piece. It appears that dough pieces have less tendency to bend back in their original shape when they leave a first bending stage. By repeating the step, this disadvantage can be solved.

This second gate may comprise a fourth and fifth conveyors, and at least one engaging means, for engaging a dough piece entering the passage and exerting a force on the dough piece with a directional component toward the first conveyor. The engaging means may be at least one wheel, but a similar arrangement as the first gate may be applied too.

It is even possible to provide the device with a third gate, with a smaller width than the second gate, arranged downstream of the second gate, as an extension of the second gate. Such third gate may then comprise a sixth and seventh conveyors, and at least one engaging means, for engaging a dough piece entering the passage and exerting a force on the dough piece with a directional component toward the first conveyor.

At least one of the pairs of conveyors formed by the second and the third conveyors or the fourth and the fifth conveyors or the sixth and seventh conveyors may be positioned in a converging way, that is, with a smaller opening at its downstream end than at its upstream end. Such pair of conveyors may gradually shape a dough piece and have a more stable formed product as a result.

The first gate may be preceded by a stage for rolling up dough pieces, in particular croissants, and the last gate may be succeeded by a pinch unit, for pinching the free ends of the bent dough product against or on top of each other.

Furthermore, the height between the surface of the conveyor and the engaging means may be adjustable, and the width between the engaging means as well. The device may be equipped with multiple gates next to each other, perpendicular to the direction of conveyance. Also the width between a pair of conveyors formed by the second and the third conveyors or the fourth and the fifth conveyors or the sixth and seventh conveyors may be adjustable.

BRIEF DESCRIPTION OF THE DRAWINGS

The drawing figures depict one or more implementations in accord with the present concepts, by way of example only.

DETAILED DESCRIPTIONS

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1:
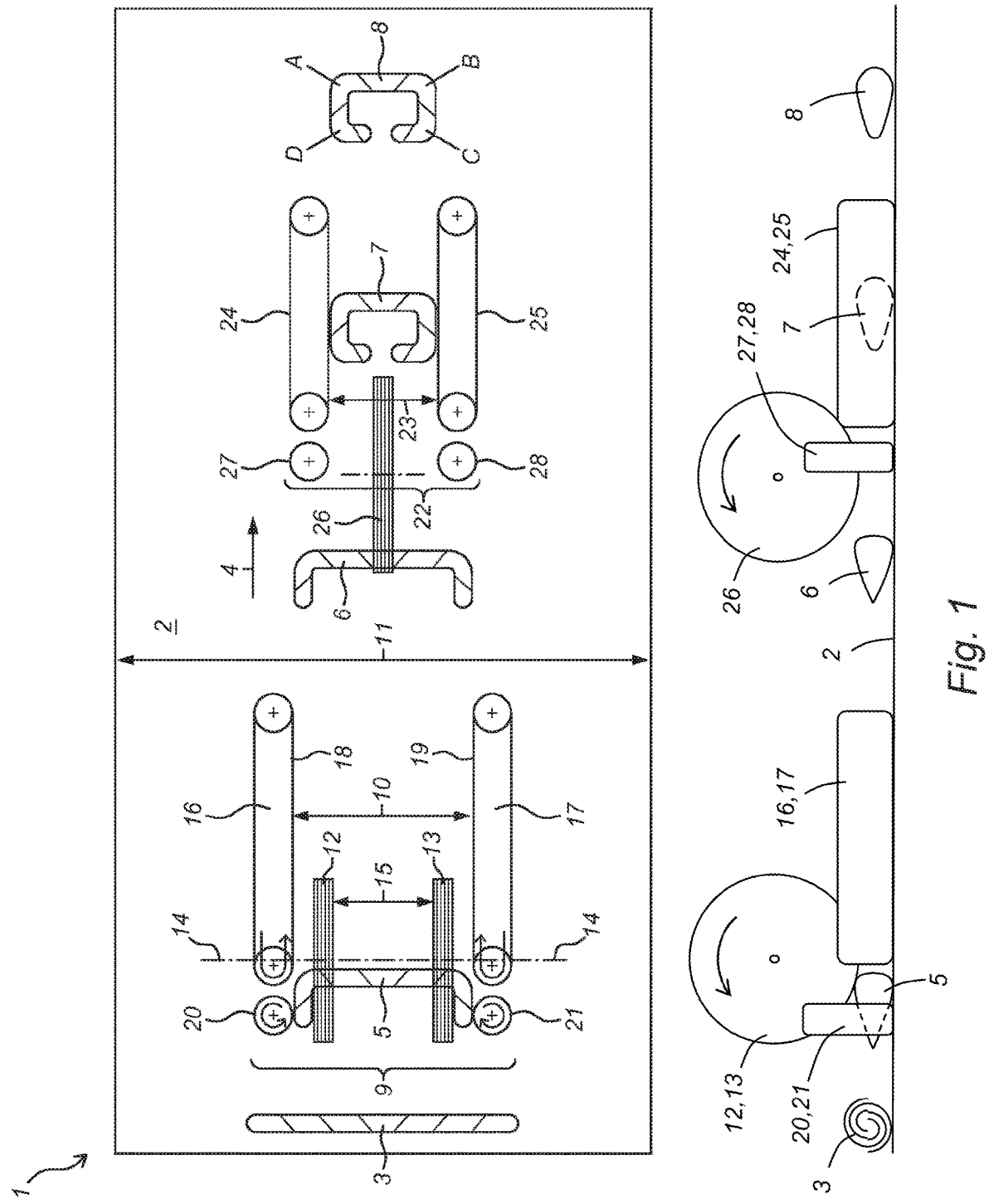
FIG. 1 shows a first embodiment of a device according to the present invention.

FIG. 1 shows a schematic top view on a device for bending dough pieces, in particular croissants. The device 1 comprises a first conveyor 2 for transporting dough pieces 3, 5, 6, 7 and 8 in a direction of conveyance 4. The device 1 comprises a first gate 9, defining a passage with a first width 10, smaller than the width 11 of the conveyor 2, for the dough pieces 3, 5, 6, 7 and 8. The first gate 9 is provided with two engaging means 12 and 13, formed by wheels that are rotatable around axis 14 for engaging a dough piece 5 entering the passage and exerting a force on the dough piece 5 with a directional component toward the first conveyor 2, wherein both engaging means 12 and 13 are spaced apart from each other in order to leave a gap 15 in between them. The wheels 12 and 13 are positioned at a distance above the first conveyor 2.

In an embodiment, the engaging means are formed by at least one wheel, in particular at least one driven wheel, positioned at a distance above the first conveyor. This may be one wheel with an H- or diabolo-shape, or two separate wheels, which may or may not be on the same shaft, and also may or may not be driven by said shaft. The use of wheels has the advantage that in addition to a directional component toward the first conveyor, a directional component along with the direction of conveyance can be applied on the dough pieces, which avoids damage to the dough pieces due to tear.

The first gate 9 comprises a third conveyor 16 and a second conveyor 17, each having a surface of conveyance 18 and 19, both surfaces facing each other and arranged with a directional component perpendicular to the (surface of conveyance of the) first conveyor 2. Evidently, the second conveyor may be formed by multiple subsequent conveyors, in particular there may be one more transitions in between. A width between the second conveyor 17 and the third conveyor 16 may be adjustable. In particular, the third and a second conveyor 16 and 17 are perpendicular to the first conveyor 2, and preferably are close to or adjacent to the surface of the first conveyor 2. With respect to a center line through the gate, in the direction of conveyance of the first conveyor, the second and third conveyor 16 and 17 may have a mutually mirrored configuration.

The front of the gate 9 comprises two pillars 20 and 21, rotatable about their length axis, extending with a directional component perpendicular to the first conveyor 2. The device furthermore comprises a second gate 22, with a smaller width 23 than the first gate 9, arranged downstream of the first gate 9, as an extension of the first gate 9.

The second gate 22 comprises a fourth and fifth conveyor 24 and 25, and at least one engaging means 26, for engaging a dough piece entering the passage and exerting a force on the dough piece 6 with a directional component toward the first conveyor 2. Also the front of the second gate 22 comprises two pillars 27 and 28, rotatable about their length axis, extending with a directional component perpendicular to the first conveyor 2. It is visible that the croissant 8, that has passed both the first gate 9 and the second gate 22 has obtained a C-shape with essentially four bends A, B, C and D. A width between the fourth and fifth conveyors 24 and 25 may be adjustable. The second gate 22 may be succeeded by a pinch unit, if the second gate 22 is the last gate, for pinching the free ends of the bent dough piece against or on top of each other.

The first conveyor 2 may be an endless conveyor, on which dough pieces are transported in a transport direction. The dough pieces may be arranged in one or more parallel lanes. The plane of conveyance may normally be a horizontal plane. The gate may define only the width of the passage, that is, it does not necessarily form a bridge over the conveyor, and the height over which it defines said width may be limited to a height level of the dough products the device is intended for. In practice, the height may for instance be between one fourth and once the width of the gate. The engaging means serve for keeping the dough piece in position with respect to the first conveyor, at least at the position where it is engaged by the engaging means, but at a result also in the position in between the engaging means. The first and second engaging means may be separate pieces of the device, or a single piece, dimensioned such that it engages the dough piece at the two locations, but not in between them. As a result, or in other words, the first and second engaging means serve to precisely define the bending locations of the dough piece, and to avoid a V-shaped dough piece.

Figure 2:
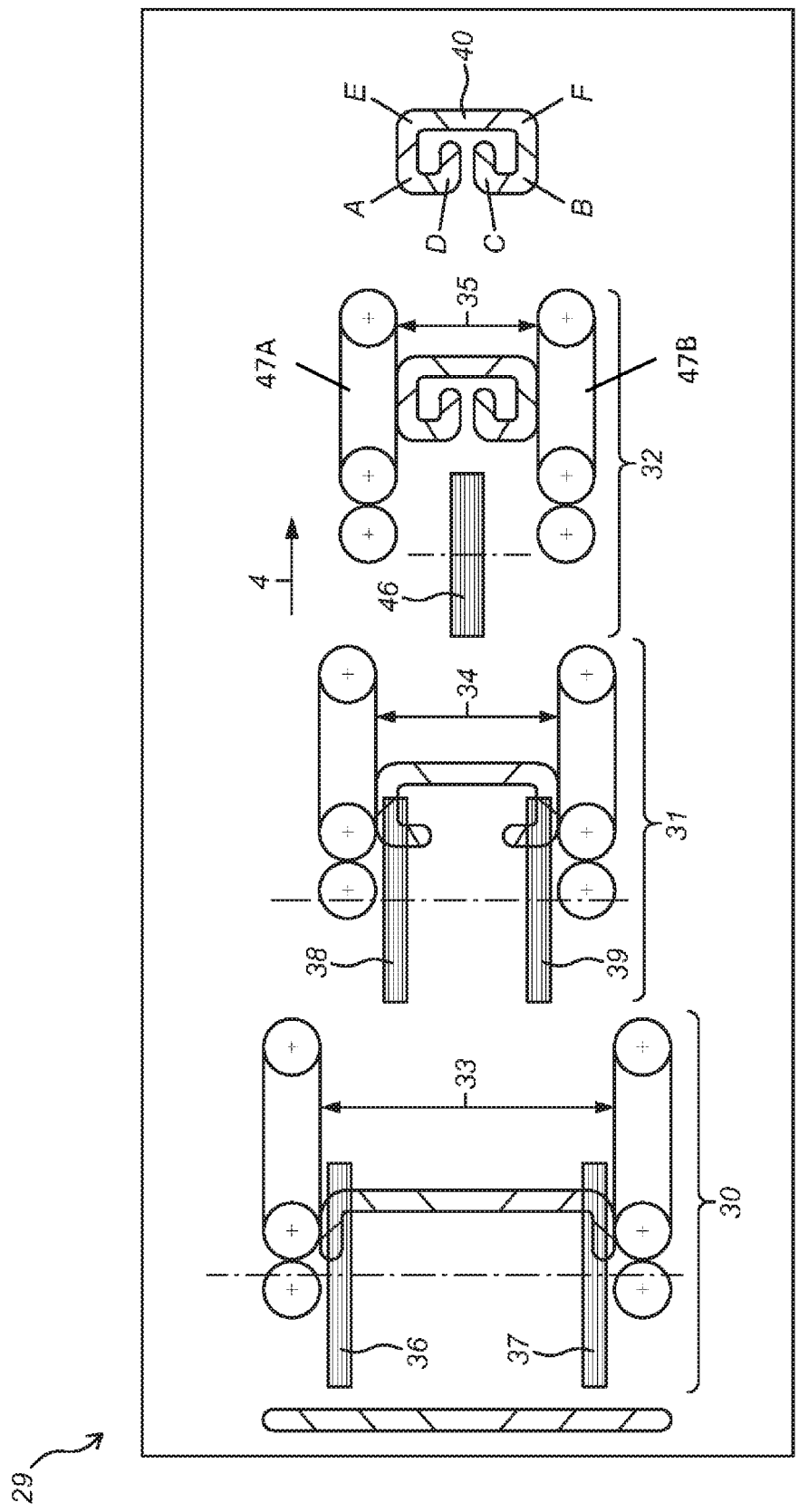
FIG. 2 shows a second embodiment of a device according to the present invention.

FIG. 2 shows a second embodiment of a device according to the present invention. The device 29 of the second embodiment comprises a cascade of three bending stages 30, 31 and 32, having subsequently descending widths 33, 34 and 35. The first stage 30 has two engagement means 36 and 37, each formed by a wheel, the second stage 31 also has two engagement means 38 and 39, also formed by two wheels, and a third stage 32 having only one engagement means formed by one wheel 46. The embodiment from FIG. 2 works essentially the same as the embodiment shown in FIG. 1, although the difference is that the three stages lead to a dough product 40 having six bends A, B, C, D, E, and F. It should be noted that the configuration and components of the first and second stages 30 and 31 may for instance correspond to that of the first gate 9 from FIG. 1. The configuration and components of the third stage 32 may correspond to that of the second gate 22 from FIG. 1. The third stage 32 may have sixth and seventh conveyors 47A and 47B. A width between the sixth and seventh conveyors 47A and 47B may be adjustable. The third stage 32 may be succeeded by a pinch unit, if the third stage 32 is the last gate, for pinching the free ends of the bent dough piece against or on top of each other.

Figure 3:
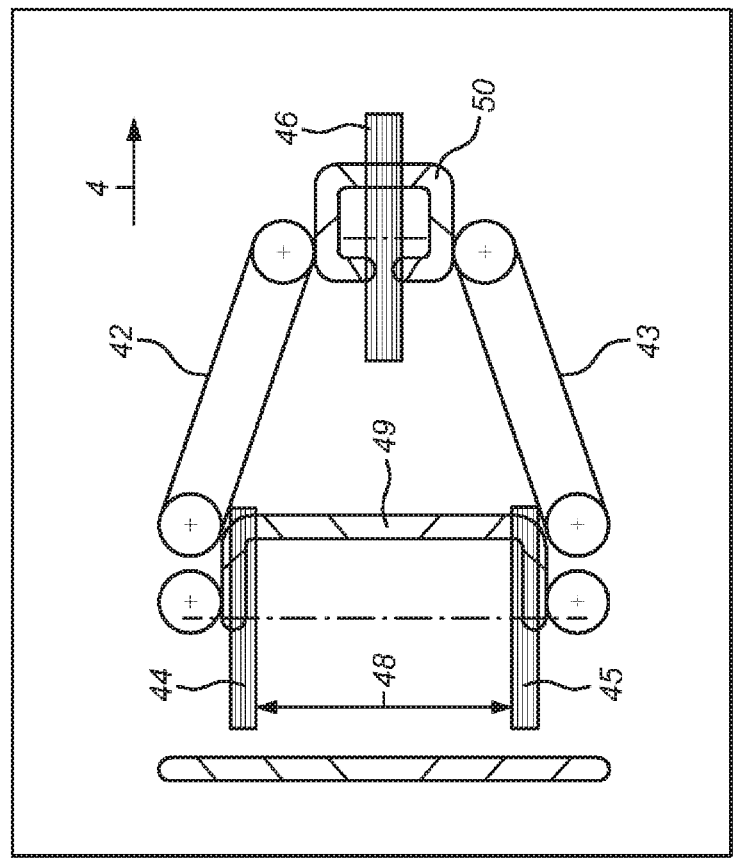
FIG. 3 shows a third embodiment of a device according to the present invention.

FIG. 3 shows a third embodiment of a device according to the present invention. The device 41 of the third embodiment comprises a pair of conveyors 42 and 43 are positioned in a converging way, that is, with a smaller opening at its downstream end than at its upstream end. This configuration allows to gradually bend dough pieces while they are conveyed, which may be an optimal configuration for specific dough types. In this configuration the gate comprises two engaging means 44 and 45 formed by wheels, for engaging a dough piece entering the passage and exerting a force on the dough piece 49 with a directional component toward the first conveyor, wherein both engaging means are spaced apart from each other in order to leave a gap 48 between them. The device comprises a third engagement means 46, formed by a wheel as well, for stabilizing the position of the dough piece 50. The second conveyor 17 and third conveyor 16 may be positioned in a converging way with a smaller opening at a downstream end than at an upstream end. The fourth and fifth conveyors 24 and 25 may be positioned in a converging way with a smaller opening at a downstream end than at an upstream end. The sixth and seventh conveyors 47A and 47B may be positioned in a converging way with a smaller opening at a downstream end than at an upstream end.

Figure 4:
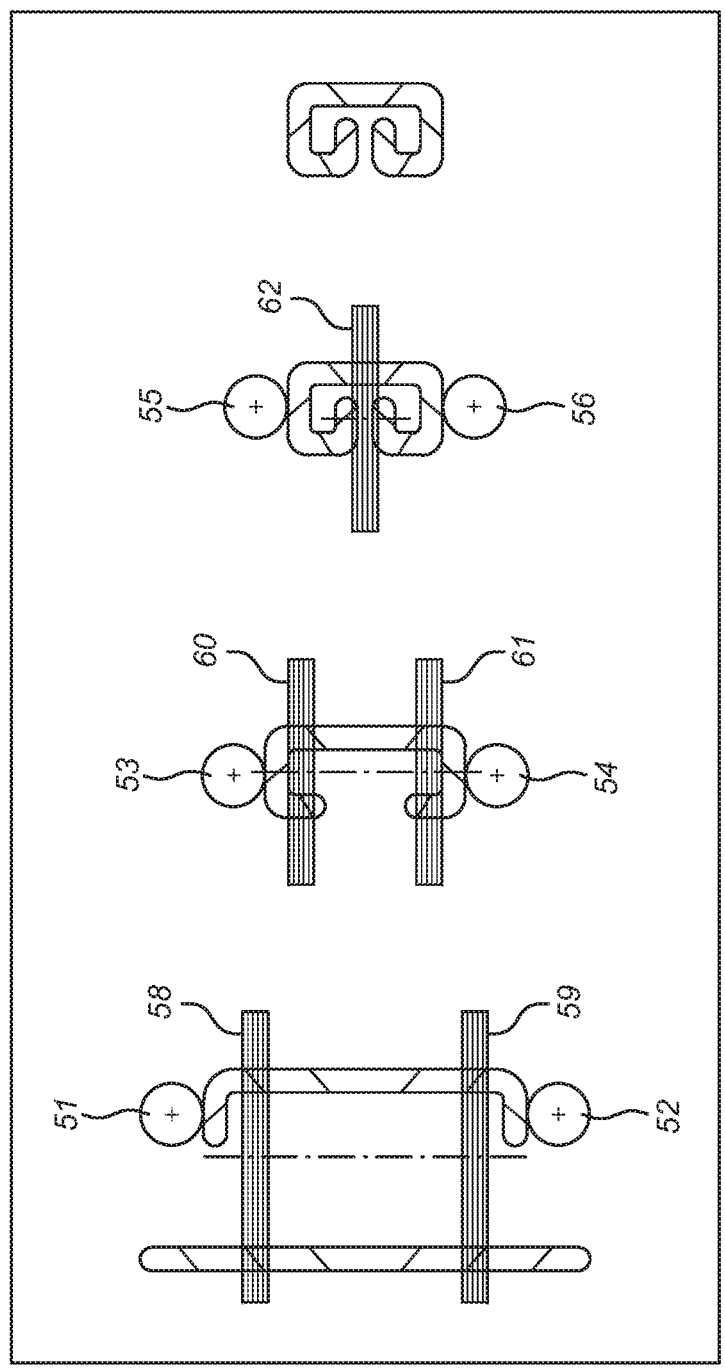
FIG. 4 shows a fourth embodiment of a device according to the present invention.

FIG. 4 shows a fourth embodiment of a device according to the present invention. In the device 57 of the fourth embodiment, the gates comprise pillars 51, 52, 53, 54, 55 and 56, besides engaging means 58, 59, 60, 61 and 62 formed by wheels. This configuration may be used to obtain a very compact device, which is suitable for dough pieces that have the property of keeping their shape without support.

The terms and descriptions used herein are set forth by way of illustration only and are not meant as limitations. Those skilled in the art will recognize that many variations are possible within the spirit and scope of the invention and the embodiments described herein.

What is claimed is:

1. A device for bending dough pieces, comprising:
a first conveyor, for transporting dough pieces in a direction of conveyance;
at least one first gate for defining a passage with a first width, which is smaller than a width of the first conveyor, for the dough pieces, wherein the first gate comprises at least two pillars that are configured to bend the dough pieces according to a gap between the pillars; and
at least two engagers that comprise wheels for engaging a dough piece entering the passage and exerting a force on the dough piece with a directional component toward the first conveyor, wherein the engagers are spaced apart from each other, dimensioned such that the engagers engage the dough piece at two locations, but not between the engagers, thus leaving a gap between the engagers.

2. The device according to claim 1, wherein the engagers are formed by at least one driven wheel, positioned at a distance above the first conveyor.

3. The device according to claim 1, wherein the first gate further comprises a second and third conveyors downstream from the at least two pillars, each of the second and third conveyors has a surf ace of conveyance, and the surf aces face each other and are arranged with a directional component perpendicular to the first conveyor.

4. The device according to claim 3, wherein the second and third conveyors are positioned in a converging way with a smaller opening at a downstream end than at an upstream end.

5. The device according to claim 3, wherein a width between the second and the third conveyors is adjustable.

6. The device according to claim 1, wherein the at least two pillars are located at a front of the first gate to guide the dough pieces into the first gate and are rotatable about length axes of the pillars, wherein the length axes extend in a direction perpendicular to the direction of conveyance.

7. The device according to claim 1, further comprising a second gate with a smaller width than the first gate, arranged downstream of the first gate as an extension of the first gate.

8. The device according to claim 7, wherein the second gate comprises a fourth and fifth conveyors, and at least one engager that comprises a wheel for engaging the dough piece entering the passage and exerting a force on the dough piece with a directional component toward the first conveyor.

9. The device according to claim 8, wherein the fourth and fifth conveyors are positioned in a converging way with a smaller opening at a downstream end than at an upstream end.

10. The device according to claim 8, wherein a width between the fourth and fifth conveyors is adjustable.

11. The device according to claim 7, wherein the second gate is succeeded by a pinch unit for pinching the free ends of the bent dough piece against or on top of each other, if the second gate is the last gate.

12. The device according to claim 7, further comprising a third gate with a smaller width than the second gate, arranged downstream of the second gate as an extension of the second gate.

13. The device according to claim 12, wherein the third gate comprises a sixth and seventh conveyors, and at least one engager that comprises a wheel for engaging the dough piece entering the passage and exerting a force on the dough piece with a directional component toward the first conveyor.

14. The device according to claim 13, wherein the sixth and seventh conveyors are positioned in a converging way with a smaller opening at a downstream end than at an upstream end.

15. The device according to claim 13, wherein a width between the sixth and seventh conveyors is adjustable.

16. The device according to claim 12, wherein the third gate is succeeded by a pinch unit for pinching the free ends of the bent dough piece against or on top of each other, if the third gate is the last gate.

17. The device according to claim 1, wherein the first gate is preceded by a stage for rolling up dough pieces.

18. The device according to claim 1, wherein the height between the surface of the first conveyor and the engagers is adjustable.

19. The device according to claim 1, wherein the width between the engagers is adjustable.

20. The device according to claim 1, further comprising multiple gates next to each other, perpendicular to the direction of conveyance.

* * * * *

UNITED STATES PATENT AND TRADEMARK OFFICE
CERTIFICATE OF CORRECTION

| | | |
|---|---|---|
| PATENT NO. | : 11,344,033 B2 | Page 1 of 1 |
| APPLICATION NO. | : 16/863478 | |
| DATED | : May 31, 2022 | |
| INVENTOR(S) | : Johannes Josephus Antonius Van Blokland | |

It is certified that error appears in the above-identified patent and that said Letters Patent is hereby corrected as shown below:

In the Claims

Column 5, Line 59: delete "surf ace" and insert --surface-- therefor; and

Column 5, Line 59: delete "surf aces" and insert --surfaces-- therefor.

Signed and Sealed this
Tenth Day of October, 2023

Katherine Kelly Vidal
*Director of the United States Patent and Trademark Office*